United States Patent [19]

Morita et al.

[11] Patent Number: 5,180,754
[45] Date of Patent: Jan. 19, 1993

[54] POLYMER COMPOSITION FOR FOAM MOLDING

[75] Inventors: Yukio Morita; Toshihiro Zushi; Nobuyoshi Matsuda; Kaneharu Suga, all of Itami; Takuma Takai, Amagasaki, all of Japan

[73] Assignee: Mitsubishi Cable Industries, Ltd., Amagasaki, Japan

[21] Appl. No.: 713,218

[22] Filed: Jun. 11, 1991

[30] Foreign Application Priority Data

Jun. 14, 1990 [JP] Japan .................. 2-156225
Jun. 14, 1990 [JP] Japan .................. 2-156226

[51] Int. Cl.$^5$ .................. C08J 9/10
[52] U.S. Cl. .................. 521/85; 521/79; 521/81; 521/908
[58] Field of Search .................. 521/85, 79, 81, 908

[56] References Cited

U.S. PATENT DOCUMENTS

| | | |
|---|---|---|
| 3,072,583 | 1/1963 | Randa .................. 521/908 |
| 3,976,605 | 8/1976 | Matsunaga et al. .................. 521/14 |
| 4,560,829 | 12/1985 | Reed et al. .................. 521/145 |
| 4,716,073 | 12/1987 | Randa .................. 521/145 |
| 4,764,538 | 8/1988 | Buckmaster et al. .................. 521/85 |
| 4,877,815 | 10/1989 | Buckmaster et al. .................. 521/92 |
| 5,023,279 | 6/1991 | Buckmaster et al. .................. 521/85 |

Primary Examiner—Morton Foelak
Attorney, Agent, or Firm—Varndell Legal Group

[57] ABSTRACT

Polymer compositions for molding in the presence of a foaming agent which comprise at least a polyolefin resin as a base resin and low polarity boron compound powder which is not decomposed at a foaming temperature, such as boron nitride powder as a nucleator. Polymer compositions of the invention are useful for formation of a foamed insulating layer on a conductive material by way of foam molding. By using said polymer composition, a foamed insulating layer excellent in insulation properties which has small dielectric loss factor, tan δ, at high frequency and high extent of foaming of not less than 70% can be obtained.

20 Claims, No Drawings

POLYMER COMPOSITION FOR FOAM MOLDING

FIELD OF THE INVENTION

The present invention relates to polymer compositions for foam molding which are excellent in insulation properties such as dielectric loss factor (hereinafter abbreviated as tan δ) and in foam moldability and suitable for forming of an insulating layer of a coaxial cable.

BACKGROUND OF THE INVENTION

There have been proposed methods of producing insulated wire having a foamed covering layer on a conductive material by foam extrusion molding an insulating material on a conductive material with or without further applying cross-linking treatment or post-foaming treatment to a coating layer formed (Japanese Patent Publication Nos. 37486/1987, 6055/1985).

Conventionally, a polymer composition containing high-density polyethylene, a nucleator such as azodicarbonamide and 4,4'-oxybis(benzenesulfonylhydrazide) and a foaming agent has been known as an insulating material used in the above-mentioned foam extrusion molding.

However, those containing azodicarbonamide as a nucleator pose problem in that they are inferior in insulation properties presumably due to by-production of polar substance as a decomposed residue resultant of decomposition at a foaming temperature, showing high tan δ of the foamed insulating layer formed. Also, those containing 4,4'-oxybis(benzenesulfonylhydrazide) need dry treatment of the foamed insulating layer formed subsequent to foam molding in response to generation of water caused by decomposition, rendering them industrially inadequate.

Furthermore, when high-density polyethylene is used as a base resin, use of a conventionally-employed nucleator such as azodicarbonamide or 4,4'-oxybis(benzenesufonylhydrazide) renders production of a foamed insulating layer having uniform, finely-divided foams with high extent of foaming, for example, not less than 70% and excellent insulation properties such as small tan δ at high frequency of 0.01–8 GHz difficult.

SUMMARY OF THE INVENTION

The object of the present invention is to provide polymer compositions capable of industrially forming a foamed insulating layer which is uniform and finely divided, and has a high extent of foaming and superior insulating properties, by foam molding.

The present invention permits accomplishment of the above object by employing as a nucleator a low polarity boron compound powder which is not decomposed at a foaming temperature.

That is, the present invention provides polymer compositions for molding conducted in the presence of a foaming agent, which contain at least a polyolefin resin as a base resin and boron compound powder having low polarity which is not decomposed at a foaming temperature (hereinafter sometimes referred to as heat-resistant, low polarity boron compound powder) as a nucleator.

DETAILED DESCRIPTION OF THE INVENTION

According to the present invention, polymer compositions capable of stable foam molding at a high extent of foaming of 70% or above can be provided by using heat-resistant, low polarity boron compound powder as a nucleator added for the purpose of controlling foam structure with the effect that a foamed insulating layer formed thereof has a foam structure excellent in uniformity and fineness, and insulation properties such as small tan δ at high frequency of 0.01–8 GHz.

Use of heat-resistant, low polarity boron compound powder further affords advantage of no generation of decomposed residue upon foaming treatment, eliminating necessary post treatment for removal thereof. Further, heat-resitant, low polarity boron compound powder per se is excellent in electrical characteristics and does not exert bad influence on properties of an insulating material.

In addition, use of propylene-ethylene copolymer as a base resin affords a foamed insulating layer further improved in extent of foaming and insulation properties in comparison with when high-density polyethylene is used, which is considered to be synergistic effect of heat-resistant, low polarity boron compound powder and propylene-ethylene copolymer.

The polymer compositions for extrusion molding in the presence of a foaming agent of the invention comprise at least a polyolefin resin as a base resin and low polarity boron compound powder which is not decomposed at a foaming temperature as a nucleator.

As the base resin, polyolefin resins such as polyethylene, specifically high-density polyethylene, polypropylene, and propylene-ethylene copolymer can be used. High-density polyethylene here means those with a density of 0.940 to 0.960. Preferable range of melt flow rate (hereinafter abbreviated as MFR) of the polyolefin resin used in the present invention is, for example, 0.5–10 g/10 min., preferably 0.6–8 g/10 min. for polyethylene, 1–20 g/10 min., preferably 1.5–15 g/10 min. for polypropylene, and 1–20 g/10 min., preferably 1.5–15 g/10 min. for propylene-ethylene copolymer. In the present invention, MFR is measured in accordance with ASTM D1238, wherein the measurement conditions are 2.16 kg load and 190° C. temperature for polyethylene, 2.16 kg load and 230° C. temperature for polypropylene, and 2.16 kg load and 230° C. temperature for propylene-ethylene copolymer.

Among the aforementioned polyolefin resins, particularly preferred are propylene-ethylene copolymer (hereinafter also referred to as PP copolymer), specifically PP copolymer comprising ethylene component at a proportion of 0.5–20 weight %, preferably 1–10 weight %. No limitation is imposed on configuration of the copolymer. There may be used one in which propylene component and ethylene component are copolymerized at random or one in which they are copolymerized in block. In the case of the block copolymer, it may be a propylene-ethylene-(propylene-ethylene) block copolymer wherein polypropylene block, polyethylene block and propylene-ethylene copolymer block are comprised therein or other block copolymer.

Flexural modulus of the PP copolymer (according to ASTM D790) is preferably not less than 50 kg/mm$^2$, more preferably 60–150 kg/mm$^2$. When flexural modulus is 50 kg/mm$^2$ or above, an effect of increased compressive strength of the foamed insulating layer can be obtained.

Izod impact strength of the PP copolymer (according to ASTM D256, with notch) is preferably not less than 3.0 kg.cm/cm, more preferably 4.0–20 kg.cm/cm. When Izod impact strength is 3.0 kg.cm/cm or above, an effect of increased impact resistance of the foamed insulating layer can be obtained.

MFR of the PP copolymer (according to ASTM D1238 at a measurement temperature of 230° C.) is preferably not less than 1.0 g/10 min., more preferably not less than 2.0 g/10 min. and most preferably 2.0-20 g/10 min. When MFR is 1.0 g/10 min. or above, motor load is small and heat generation is less frequent, which facilitates stable foam molding.

There is no particular limitation on heat-resistant, low polarity boron compound powder as a nucleator as long as it is not decomposed at a foaming temperature and has low polarity, and it is exemplified by boron nitride powder. Low polarity here means that dielectric constant is preferably not more than 6, more preferably not more than 5.5 and volume-specific resistance is preferably not less than $10^{13}$ Ω-cm, more preferably not less than $10^{14}$ Ω-cm as the conditions to be encountered by the polymer compositions of the invention, which conditions being under frequency of 0.001-10 GHz, at room temperature. Average particle diameter of the powder is 100 μm or below, preferably 50 μm or below, more preferably 20 μm or below, and most preferably 1-10 μm. When the particle diameter is 100 μm or below, an effect of foam structure of the foamed insulating layer formed being uniform and fine can be obtained. When the particle diameter is 1 μm or above, an effect of foam structure being fine can be obtained due to the absence of aggregation of the boron compound powder.

From the viewpoint of insulation properties of the foamed insulating layer, it is desirable to use heat-resistant, low polarity boron compound powder having purity of not less than 95%, particularly not less than 98% and water content of not more than 0.8%, particularly not more than 0.5%, most preferably not more than 0.3%. When purity is 95% or above and water content is 0.8% or below, tan δ of the foamed insulating layer at high frequency is small and insulation properties are excellent.

The nucleator is used in mixture with a base resin in advance. The amount of the nucleator is generally 0.1-5 parts by weight, particularly 0.2-2 parts by weight to 100 parts by weight of the base resin.

A nucleator conventionally known in this field other than the heat-resistant, low polarity boron compound powder can also be contained to a degree which is not detrimental to the characteristic properties of the invention. For example, finely divided powder of inorganic compounds such as alumina, zirconia and talc, or organic foaming compounds such as azodicarbonamide and 4,4'-oxybis(benzenesulfonylhydrazide) can be used. The amount of a nucleator other than the heat-resistant, low polarity boron compound powder is preferably up to 50 parts by weight, more preferably up to 30 parts by weight to 100 parts by weight of the heat-resistant, low polarity boron compound powder.

If necessary, an additive such as a copper inhibitor, an antioxidant and a coloring agent may be contained in the polymer composition of the invention. The amount to be added is generally 0.05-2.0 parts by weight, preferably 0.1-1.0 part by weight to 100 parts by weight of a base resin.

The polymer compositions of the invention are used for forming a foamed insulating layer on a conductive material by foam molding in the presence of a foaming agent. For example, application of a polymer composition on a conductive material so as to form an insulating layer on the conductive material is conducted by extrusion molding in the presence of a foaming agent, and upon molding, an insulating layer of foam structure can be formed simultaneously. Note that the foamed insulating layer formed is not necessarily in the final stage but can be subjected to a cross-linking treatment or postfoaming treatment.

A foaming agent is used for the foaming treatment of the polymer compositions of the invention. Such foaming agent may be mixed in the polymer composition prior to feeding into an extruder, or may be supplied via another feeding device other than the feed zone of the extruder.

As the foaming agent, a suitable one may be used depending on molding temperature, foaming conditions or methods of foam molding. Generally, inert gas such as nitrogen and carbon dioxide, fluorocarbon, chlorofluorocarbon and hydrocarbon is used. Among these foaming agents, chlorofluorocarbon containing hydrogen atom, such as HCFC 22 (monochlorodifluoroethane), HCFC 123, HCFC 124 and HCFC 142b, fluorocarbon not containing chlorine atom, nitrogen, carbon dioxide are specifically preferable in view of the uniform and fine foams provided to a base polymer to a high extent. What is more, these preferable foaming agents do not break ozone layer and are desirable in terms of environmental protection.

The amount of the foaming agent to be used is generally 0.2-20 parts by weight, particularly 0.5-10 parts by weight to 100 parts by weight of a base resin, to which it is not limited.

The polymer compositions of the invention can easily form a highly expanded layer having an extent of foaming (occupying gap volume in the foamed layer) of not less than 50%, preferably 70-90%, and thus, can be used advantageously for formation of a thick insulating layer. Additionally, they have insulation properties of having small tan δ at high frequency of 0.01-8 GHz, and can be preferentially used for an insulating material for coaxial cable.

Hereinbelow, the present invention is in detail described by working examples and comparative examples which is not construed as limitative.

EXAMPLE 1

A mixture of high-density polyethylene (MFR 10 g/10 min., density 0.945 g/cm$^3$, flexural modulus 57 kg/mm$^2$, Izod impact strength 25 kg.cm/cm, 100 parts by weight) and boron nitride fine powder of 5 μm average particle diameter (purity 99.1%, water content 0.05%, 0.2 part by weight) was supplied in a 30 mm diameter extrusion machine of 28 L/D, and foam extruded on a 0.814 mm diameter annealed copper wire while adding HCFC 22 from a foaming agent inlet formed separately in the extruder, to form an insulated wire having a foamed insulating layer of 10 mm outer diameter, to the outside of which foamed insulating layer were applied copper wire braid and PVC sheath to give a coaxial cable.

EXAMPLE 2

A coaxial cable was obtained in the same manner as in Example 1 except that the boron nitride fine powder was added by 0.5 part by weight.

EXAMPLE 3

A coaxial cable was obtained in the same manner as in Example 1 except that the boron nitride fine powder was added by 1.0 part by weight.

EXAMPLE 4

A coaxial cable was obtained in the same manner as in Example 1 except that the boron nitride fine powder was added by 2.0 parts by weight.

COMPARATIVE EXAMPLE 1

A coaxial cable was obtained in the same manner as in Example 1 except that the boron nitride fine powder was replaced with 1.0 part by weight of alumina fine powder.

COMPARATIVE EXAMPLE 2

A coaxial cable was obtained in the same manner as in Example 1 except that the boron nitride fine powder was replaced with 2.0 parts by weight of alumina fine powder.

COMPARATIVE EXAMPLE 3

A coaxial cable was obtained in the same manner as in Example 1 except that the boron nitride fine powder was replaced with 1.0 part by weight of zirconia fine powder.

COMPARATIVE EXAMPLE 4

A coaxial cable was obtained in the same manner as in Example 1 except that the boron nitride fine powder was replaced with 1.0 part by weight of magnesia fine powder.

COMPARATIVE EXAMPLE 5

A coaxial cable was obtained in the same manner as in Example 1 except that the boron nitride fine powder was replaced with 0.5 part by weight of azodicarbonamide.

COMPARATIVE EXAMPLE 6

A coaxial cable was obtained in the same manner as in Example 1 except that the boron nitride fine powder was replaced with 1.0 part by weight of azodicarbonamide.

COMPARATIVE EXAMPLE 7

A coaxial cable was obtained in the same manner as in Example 1 except that the boron nitride fine powder was replaced with 2.0 parts by weight of azodicarbonamide.

EVALUATION TEST 1

Extent of foaming of the foamed insulating layer of the coaxial cable as obtained in Examples 1–4 and Comparative Examples 1–7 was examined. Further, high frequency of 1.0 GHz was applied on the coaxial cable at room temperature and tan δ was calculated from damping attenuation. The results are summarized in Table 1.

TABLE 1

| | Extent of foaming (%) | tan δ |
|---|---|---|
| Example 1 | 79 | $1.7 \times 10^{-4}$ |
| Example 2 | 80 | $1.6 \times 10^{-4}$ |
| Example 3 | 80 | $1.6 \times 10^{-4}$ |
| Example 4 | 81 | $1.5 \times 10^{-4}$ |
| Comp. Ex. 1 | 71 | $1.9 \times 10^{-4}$ |
| Comp. Ex. 2 | 72 | $2.3 \times 10^{-4}$ |
| Comp. Ex. 3 | 70 | $1.7 \times 10^{-4}$ |
| Comp. Ex. 4 | 73 | $1.5 \times 10^{-4}$ |
| Comp. Ex. 5 | 80 | $2.1 \times 10^{-4}$ |
| Comp. Ex. 6 | 80 | $2.5 \times 10^{-4}$ |
| Comp. Ex. 7 | 81 | $3.6 \times 10^{-4}$ |

Note that the foamed insulating layer had a uniform and fine foam structure in every example wherein boron nitride fine powder was used, while in Comparative Examples 3 and 4 where zirconia and magnesia fine powders were used, the foam structure was not uniform but giant, although not so much as when a nucleator was not used.

There was almost no increase in tan δ caused by increased mixing amounts of boron nitride fine powder in examples where it was used, while tan δ increased along with increased mixing amounts of alumina fine powder or azodicarbonamide, showing no satisfactory insulation properties.

EXAMPLE 5

A mixture of propylene-ethylene random copolymer containing 5 weight % of ethylene component (MFR 1.8 g/10 min., density 0.90 g/cm$^3$, flexural modulus 63 kg/mm$^2$, Izod impact strength 6.0 kg. cm/cm, 100 parts by weight) and boron nitride fine powder of 5 μm average particle diameter (purity 99.1%, water content 0.05%, 1 part by weight) was supplied in a 30 mm diameter extruder of 28 L/D, and foam extruded on a 0.814 mm diameter annealed copper wire while adding HCFC 22 from a foaming agent inlet formed separately in the extruder, to form an insulated wire having a foamed insulating layer of 10 mm outer diameter, to the outside of which foamed insulating layer were applied copper wire braid and PVC sheath to give a coaxial cable.

EXAMPLE 6

A coaxial cable was obtained in the same manner as in Example 1 except that propylene-ethylene block copolymer containing 3 weight % of ethylene component (MFR 7.8 g/10 min., density 0.89 g/cm$^3$, flexural modulus 85 kg/mm$^2$, Izod impact strength 7.5 kg. cm/cm) was used as a base resin.

EXAMPLE 7

A coaxial cable was obtained in the same manner as in Example 1 except that propylene-ethylene-(propylene-ethylene) block copolymer containing 2 weight % of ethylene component (MFR 9.0 g/10 min., density 0.90 g/cm$^3$, flexural modulus 92 kg/mm$^2$, Izod impact strength 4.0 kg. cm/cm) was used as a base resin.

EXAMPLE 8

A coaxial cable was obtained in the same manner as in Example 1 except that high-density polyethylene (MFR 1.8 g/10 min., density 0.94 g/cm$^3$, flexural modulus 54 kg/mm$^2$, Izod impact strength 30 kg. cm/cm) was used as a base resin.

COMPARATIVE EXAMPLE 8

A coaxial cable was obtained in the same manner as in Example 1 except that ethylene-propylene rubber (JSR Corp., Product Name: EP02P) was used as a base resin.

COMPARATIVE EXAMPLE 9

A coaxial cable was obtained in the same manner as in Example 1 except that modified polyphenylene oxide (GE Plastics, Noryl® 731J) was used as a base resin.

COMPARATIVE EXAMPLE 10

A coaxial cable was obtained in the same manner as in Example 2 except that high-density polyethylene as used in Example 8 was used as a base resin and boron nitride fine powder was replaced with alumina fine powder (1.0 part by weight).

COMPARATIVE EXAMPLE 11

A coaxial cable was obtained in the same manner as in Example 2 except that high-density polyethylene as used in Example 8 was used as a base resin and boron nitride fine powder was replaced with azodicarbonamide (1.0 part by weight).

EVALUATION TEST 2

Extent of foaming and tan δ of the foamed insulating layer of the coaxial cable as obtained in Examples 5-8 and Comparative Examples 8-11 were examined in the same manner as in Evaluation Test 1. The results are summarized in Table 2.

TABLE 2

|  | Extent of foaming (%) | tan δ |
| --- | --- | --- |
| Example 5 | 87 | $1.1 \times 10^{-4}$ |
| Example 6 | 86 | $1.1 \times 10^{-4}$ |
| Example 7 | 87 | $1.1 \times 10^{-4}$ |
| Example 8 | 71 | $1.6 \times 10^{-4}$ |
| Comp. Ex. 8 | 75 | $4.7 \times 10^{-4}$ |
| Comp. Ex. 9 | 70 | $11.8 \times 10^{-4}$ |
| Comp. Ex. 10 | 71 | $1.9 \times 10^{-4}$ |
| Comp. Ex. 11 | 82 | $2.6 \times 10^{-4}$ |

In Example 8 wherein high-density polyethylene was used as a base resin and boron nitride fine powder was used as a nucleator, a foamed insulating layer with small tan δ and superior electrical characteristics as compared with Comparative Examples 10 and 11 wherein the same base resin was employed and alumina fine powder or azodicarbonamide was used as a nucleator. When boron nitride fine powder was used as a nucleator, extent of foaming and tan δ were both improved in Examples 5-7 wherein PP copolymer was used as a base resin, as compared with Example 8 wherein high density polyethylene was used. In every example as described, the foamed insulating layer had a uniform and fine foam structure.

The polymer compositions for foam molding of the present invention have high extent of foaming, and are excellent in fineness and uniformity of foam structure due to the use of heat-resistant, low polarity boron compound powder as a nucleator, which are capable of forming a foamed insulating layer excellent in insulation properties by foam molding stably and efficiently. In addition, use of heat-resistant, low polarity boron compound powder as a nucleator renders dry treatment of a foamed insulating layer formed unnecessary since no decomposition producing water occurs, resulting in improved productivity of cable. Moreover, use of PP copolymer as a base resin affords a foamed insulating layer with high extent of foaming, superior insulation properties, and excellent mechanical strength due to synergistic effect of boron compound powder and PP copolymer, as compared with those using high density polyethylene as a base resin.

What is claimed is:

1. A foamable electrical insulator composition consisting essentially at least a propylene-ethylene copolymer containing 0.5-20 weight % ethylene component as a base resin, a foaming agent and a low polarity boron compound powder which is not decomposed at a foaming temperature as a nucleator.

2. A foamable electrical insulator composition according to claim 1, wherein the nucleator is boron nitride powder.

3. A foamable electrical insulator composition according to claim 1, wherein particle diameter of the nucleator is not more than 100 μm.

4. A foamable electrical insulator composition according to claim 1, wherein purity of the nucleator is not less than 95%.

5. A foamable electrical insulator composition according to claim 1, wherein water content of the nucleator is not more than 0.8%.

6. A foamable electrical insulator composition according to claim 1, wherein the propylene-ethylene copolymer containing 0.5-20 weight % of ethylene component has a flexural modulus of not less than 50 kg/mm².

7. A foamable electrical insulator composition according to claim 1, wherein the propylene-ethylene copolymer containing 0.5-20 weight % of ethylene component has an Izod impact strength of not less than 3.0 kg. cm/cm.

8. A foamable electrical insulator composition according to claim 1, wherein the propylene-ethylene copolymer containing 0.5-20 weight % of ethylene component has a melt flow rate of not less than 1.0 g/10 min.

9. A foamable electrical insulator composition according to claim 1, wherein the foaming agent is (monochlorodifluoroethane).

10. An insulator for a coaxial cable prepared from a composition consisting essentially of propylene-ethylene copolymer as a base resin, a foaming agent and a nucleator of low polarity boron compound powder which does not decompose at a foaming temperature.

11. An insulator for a coaxial cable according to claim 10, wherein the nucleator is boron nitride powder.

12. An insulator for a coaxial cable according to claim 10, wherein particle diameter of the nucleator is not more than 100 μm.

13. An insulator for a coaxial cable according to claim 10, wherein purity of the nucleator is not less than 95%.

14. An insulator for a coaxial cable according to claim 10, wherein the the propylene-ethylene copolymer contains 0.5-20 weight % of ethylene component.

15. An insulator for a coaxial cable according to claim 14, wherein said propylene-ethylene copolymer has a flexural modulus of not less than 50 kg/mm².

16. An insulator for a coaxial cable according to claim 14, wherein said propylene-ethylene copolymer has an Izod impact strength of not less than 3.0 kg. cm/cm.

17. An insulator for a coaxial cable according to claim 14, wherein said propylene-ethylene copolymer has a melt flow rate of not less than 1.0 g/10 min.

18. The foamable insulator composition according to claim 1, wherein the propylene-ethylene copolymer contains 1-10 weight % of ethylene component.

19. The insulator for a coaxial cable according to claim 12, wherein the propylene-ethylene copolymer contains 1-10 weight % of ethylene component.

20. An insulator for a coaxial cable according to claim 10, wherein the foaming agent is monochlorodifluoroethane.

* * * * *